(12) United States Patent
Womack et al.

(10) Patent No.: US 6,625,849 B1
(45) Date of Patent: Sep. 30, 2003

(54) CABLE STRAIN RELIEF

(75) Inventors: Wade J. Womack, Allen, TX (US); Thyagarajan Ramachandran, Arlington, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/703,115

(22) Filed: Oct. 31, 2000

(51) Int. Cl.$^7$ ............................................... F16G 11/00
(52) U.S. Cl. .................... 24/115 M; 24/136 R
(58) Field of Search ........................... 24/16 PB, 129 B, 24/130, 115 G, 115 M, 136 B, 136 K, 136 L, 136 R; 206/343; 256/54, 56; 403/355, 374.1; 439/98, 404, 407, 417, 460, 469, 472, 607, 608, 610; 248/49, 58, 63, 64, 65, 74.1, 74.2, 74.4, 74.5

(56) References Cited

U.S. PATENT DOCUMENTS

| 1,154,916 | A | * | 9/1915 | Evans ........................ 24/136 R |
| 2,587,239 | A | * | 2/1952 | Smith .......................... 439/397 |
| 3,273,705 | A | * | 9/1966 | Rieger et al. ................. 206/343 |
| 3,715,782 | A | * | 2/1973 | Newell ......................... 24/130 |
| 3,772,571 | A | * | 11/1973 | Merry et al. ................. 361/679 |
| 3,899,149 | A | * | 8/1975 | Schneider ..................... 248/75 |
| 4,214,805 | A | * | 7/1980 | Faulconer ................... 439/417 |
| 4,313,243 | A | * | 2/1982 | Childress et al. ......... 24/136 K |
| 4,391,484 | A | * | 7/1983 | Foederer ..................... 439/404 |
| 4,534,464 | A | * | 8/1985 | Lankton ..................... 206/343 |
| 4,839,946 | A | * | 6/1989 | Murai ....................... 24/115 G |
| 5,073,126 | A | * | 12/1991 | Kikuchi et al. ......... 439/460 X |
| 5,360,188 | A | * | 11/1994 | Condon ................. 24/136 L X |
| 5,399,097 | A | * | 3/1995 | Sakai et al. ................. 439/395 |
| 5,415,562 | A | * | 5/1995 | Matsumoto et al. ........ 439/397 |
| 5,515,614 | A | * | 5/1996 | Wing ........................... 33/548 |
| 5,540,600 | A | * | 7/1996 | Ivey ........................... 439/417 |
| 5,562,478 | A | * | 10/1996 | Yamamoto ............... 439/417 X |
| 5,622,517 | A | * | 4/1997 | Heng et al. ................. 439/417 |
| 5,675,872 | A | * | 10/1997 | Emery .......................... 24/130 |
| 5,681,180 | A | * | 10/1997 | Rodrigues ................... 439/404 |
| 6,592,272 | | * | 12/1997 | Woods ........................ 24/459 |
| 5,816,841 | A | * | 10/1998 | Grant .......................... 439/354 |
| 5,921,805 | A | * | 7/1999 | Tabata et al. ................ 439/457 |
| 6,058,575 | A | * | 5/2000 | Dagan ....................... 24/136 R |
| 6,081,642 | A | * | 6/2000 | Asada .......................... 385/59 |
| 6,238,236 | B1 | * | 5/2001 | Craft, Jr. ................ 439/460 X |
| 6,302,734 | B1 | * | 10/2001 | Ichio et al. ................. 439/587 |

* cited by examiner

Primary Examiner—Robert J. Sandy
Assistant Examiner—Ruth C. Rodriguez
(74) Attorney, Agent, or Firm—Jones Day

(57) ABSTRACT

A cable strain relief includes a cable retainer having a slot for receiving a cable. A clip has a projection receivable in the slot to bear against the cable to hold same to the retainer. A fastener is extended through aligned holes in the retainer and the clip projection to secure the clip to the retainer in clamping relationship with the cable.

16 Claims, 4 Drawing Sheets

CABLE STRAIN RELIEF

BACKGROUND OF THE INVENTION

This application relates to the art of strain reliefs and, more particularly, to strain reliefs for flexible conductors. The invention is particularly applicable to strain reliefs for fiber optic cables and will be described with specific reference thereto. However, it will be appreciated that the invention has broader aspects and can be used with other flexible conductors and cables.

Flexible electrical conductors commonly are clamped to a retainer for strain relief purposes with little regard to the clamping force that is applied to the conductor. Fiber optic cables that conduct light are relatively delicate and can be damaged when subjected to excessive clamping force. Therefore, it would be desirable to have a strain relief arrangement for fiber optic cables that provides controlled compression of the fiber optic cable to minimize the possibility of damaging same.

SUMMARY OF THE INVENTION

In accordance with the present application, a strain relief for fiber optic cables includes a retainer and a clip. The retainer has a slot for receiving a cable and the clip has a projection that is receivable in the slot for compressing the cable between the slot bottom and the projection tip.

The length of the projection on the clip is designed to extend a predetermined distance into the slot and thereby control the degree of compression exerted on the cable. In other words, the distance between the projection tip and the slot bottom is controlled and varied depending on the size of the cable that is received in the slot.

In a preferred arrangement, the slot has opposite slot sidewalls that diverge in a direction upwardly away from the slot bottom so that the slot is tapered. Likewise, the clip projection has opposite projection side faces that converge toward the projection tip at the same angle as the divergence angle of the slot sidewalls for close reception in the slot.

In accordance with another aspect of the application, a securing feature is provided for securing the clip to the retainer. In one arrangement, the securing feature includes aligned transverse holes through the retainer and the clip projection for receiving a fastener to secure the clip to the retainer in engagement with a fiber optic cable.

In accordance with another aspect of the application, the clip is supplied as an array of a plurality of individual clips that are connected together by frangible connections. At least two of the clips have projections of different lengths for use with cables of different sizes. Cable gauge holes in the base of each clip receive the end of a cable to identify the appropriate clip for use with that cable.

It is a principal object of the present invention to provide an improved strain relief for fiber optic cables.

It is another object of the invention to provide an improved strain relief that applies controlled compression to a fiber optic cable.

It is additional object of the invention to provide a cable strain relief that accommodates cables of different sizes and shapes while providing controlled compression of the cables.

DESCRIPTION OF A PREFERRED EMBODIMENT

Figure 1:
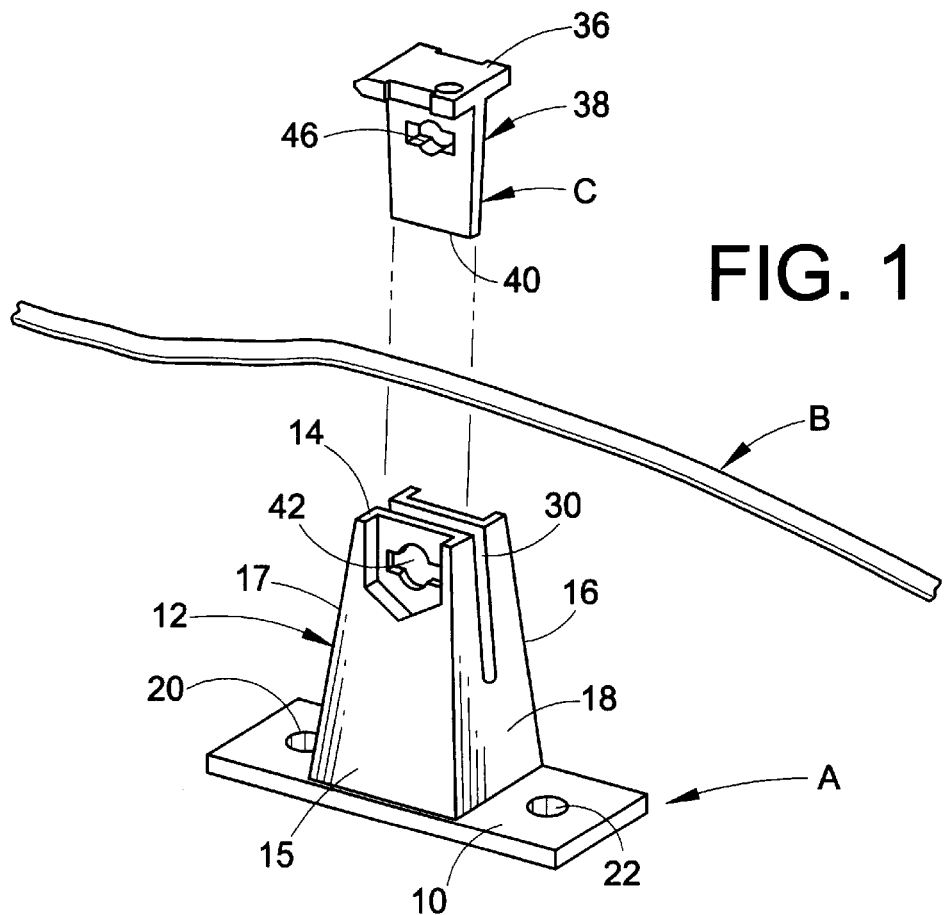
FIG. 1 is an exploded perspective illustration of a strain relief clip and retainer in accordance with the present application.

Referring now to the drawing, wherein the showings are for purposes of illustrating a preferred embodiment of the invention only and not for purposes of limiting same, FIG. 1 shows a retainer A having a flat base 10 and a generally rectangular post 12 extending upwardly perpendicular thereto.

Post 12 has a top end 14, opposite side faces 15, 16 and opposite end faces 17, 18. Opposite side faces 15, 16 and opposite end faces 17, 18 slope inwardly in a direction from base 10 toward post top end 14 so that the post has the general shape of a tetrahedron. Base 10 projects outwardly beyond opposite end faces 17, 18 of post 12 to provide base mounting portions having fastener receiving holes 20, 22 therethrough for use in attaching retainer A to a support surface.

An upwardly open slot 30 is provided in post 12 for receiving a fiber optic cable B. Slot 30 is centered between post side faces 15, 16, and extends between and opens outwardly at post end faces 17, 18. Slot 30 opens outwardly at top end 14 of post 12 and extends therefrom downwardly toward retainer base 10. Cable B is received within slot 30 against the slot bottom.

A clip C is provided for applying a compressive force against cable B and holding same to retainer A within slot 30. Clip C includes an enlarged flat base 36 having a central generally flat projection 38 extending therefrom. Projection 38 has a projection tip 40 that engages cable B for holding same within slot 30 on retainer A. The length of projection 38 from the underside of clip base 36 to projection tip 40 is designed to provide a predetermined spacing between projection tip 40 and the bottom of slot 30. This provides controlled compression on cable B to minimize any possibility of damaging same.

Post 12 has aligned fastener receiving holes 42, 44 therethrough. Clip projection 38 also has a fastener receiving hole 46 therethrough that is aligned with retainer holes 42, 44 when the underside of clip base 36 is bottomed out against top end 14 of post 12. The centerline of holes 42, 44 adjacent the top end of post 12 is indicated at 42a in FIG. 5. Thus, holes 42, 44 are located adjacent post top end 14 and are spaced more than one-half the distance from slot bottom 70 toward post top end 14.

Figure 2:
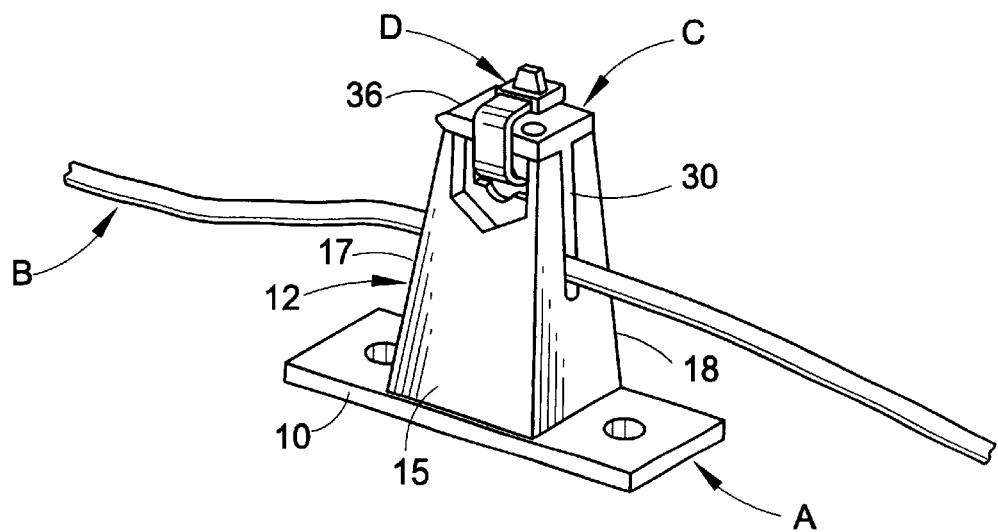
FIG. 2 is a perspective illustration of the strain relief of the present application showing the clip secured to the retainer.

A suitable fastener is extended through the aligned holes for locking clip C to retainer A. In one arrangement, the fastener may be a flexible plastic cable tie that is extended through the aligned holes and then secured together over and around the clip base as indicated for cable tie D in FIG. 2. Examples of suitable cable ties include those disclosed in U.S. Pat. Nos. 4,135,749, 5,911,368 and 5,956,813.

Figure 3:
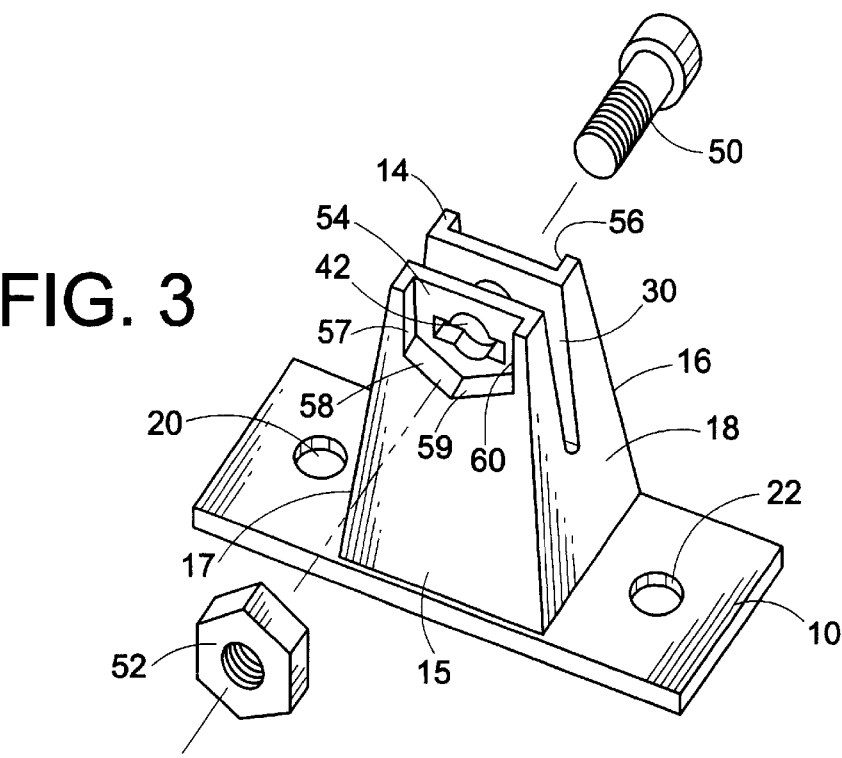
FIG. 3 is a perspective illustration of the retainer component of the strain relief of the present application.
Figure 4:
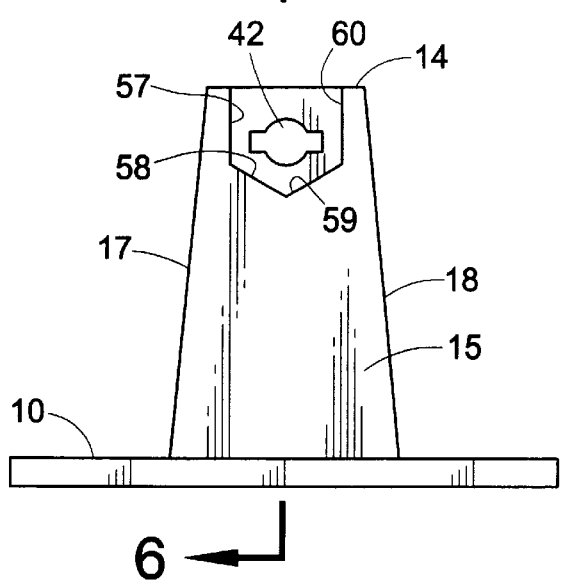
FIG. 4 is a side elevational view of the retainer of FIG. 3.

In the alternative, a screw 50 and nut 52 of FIG. 3 may be used for locking the clip to the retainer. Post 12 has opposite recesses 54, 56 in side faces 15, 16 adjacent post top end 14 with recess peripheral surfaces 57–60 that lie on the periphery of a hexagon to cooperate with a hexagonal periphery of nut 52. This allows tightening of screw 50 without requiring a tool to hold nut 52 against rotation. Obviously, other non-circular peripheral shapes may be provided for the recesses to cooperate with a corresponding non-circular peripheral shape on a nut.

Figure 5:
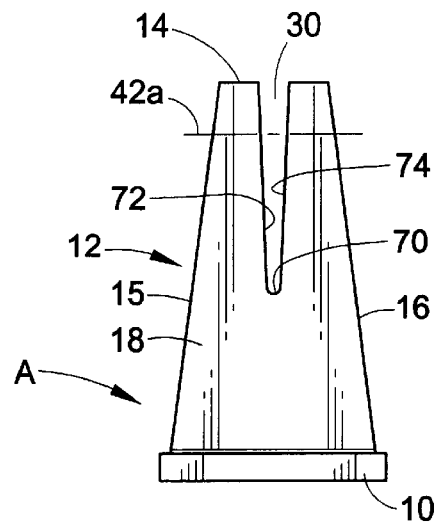
FIG. 5 is an end elevational view of the retainer of FIGS. 3 and 4.
Figure 6:
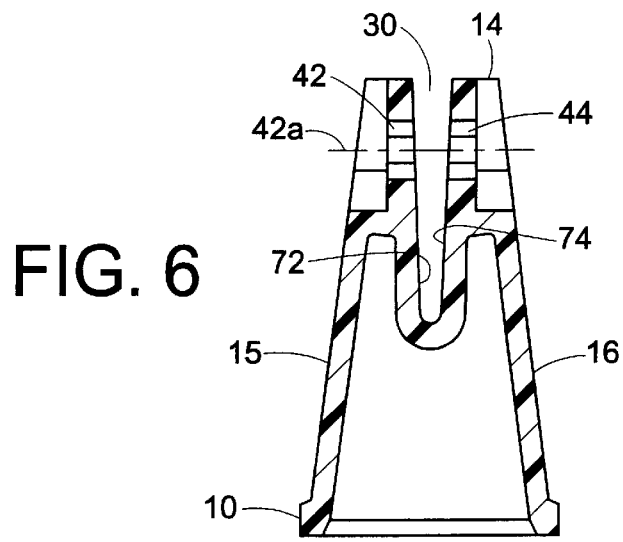
FIG. 6 is a cross-sectional elevational view taken generally on line 6—6 of FIG. 4.

As shown in FIGS. 5 and 6, slot 30 has a circular curved slot bottom 70, and opposite slot sidewalls 72, 74. Slot sidewalls 72, 74 diverge upwardly in a direction away from slot bottom 70 toward post top end 14 at an included angle of 4°. Thus, each sidewall is outwardly inclined to the vertical at an angle of 2°.

Slot 30 has a depth dimension extending from post top end 14 to slot bottom 70. The depth of the slot is greater than one-half the length of post 12 from the upper surface of base 10 to post top end 14. By way of example, where post 12 has a length from the upper surface of base 10 to top end 14 of 1.308 inches, the depth of slot 30 is 0.755 inches. Slot 30 has a slot width in a direction between opposite slot sidewall 72, 74. The width of slot 30 gradually decreases in a direction from post top end 14 toward slot bottom 70. Slot 30 has a slot length in a direction between post opposite ends 17, 18 and in the direction of the longitudinal axis of fiber optic cable B. The length of the slot also decreases in a direction upwardly from slot bottom 70 due to the inward slope of post end faces 17, 18.

Figure 7:
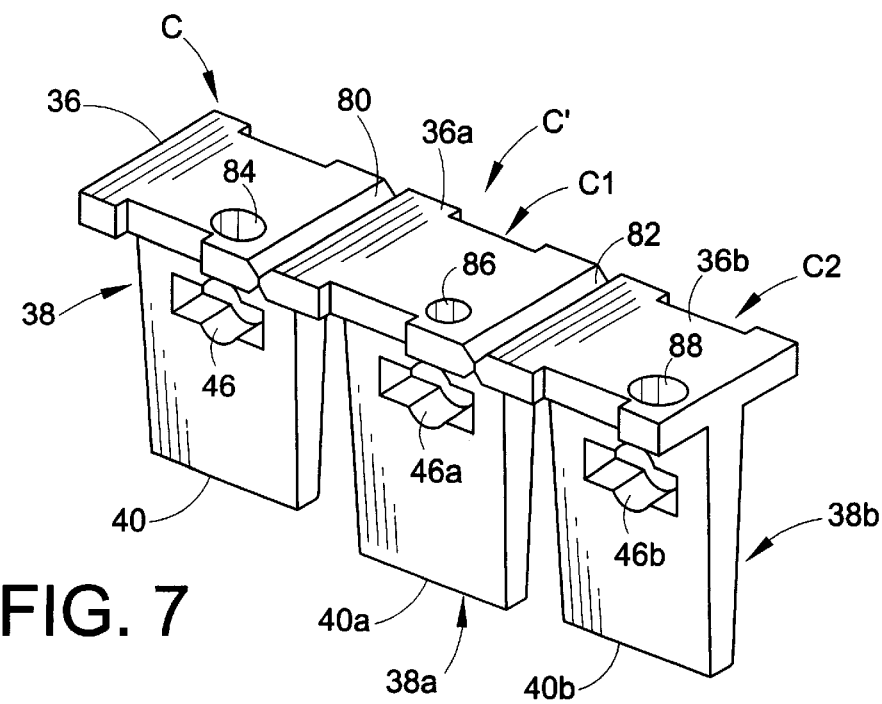
FIG. 7 is a perspective illustration of a clip array for use with the retainer of FIGS. 3–6.
Figure 8:
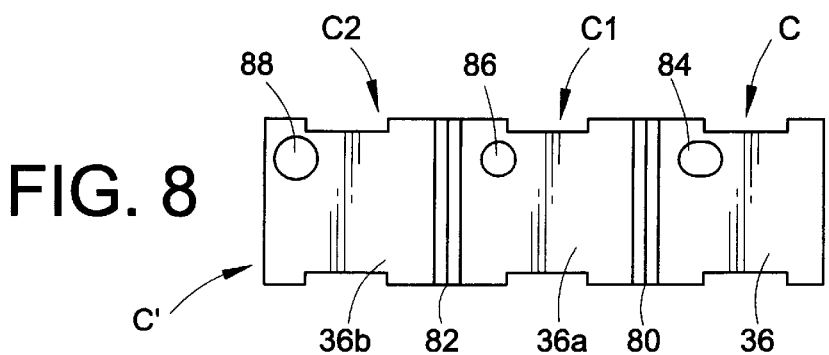
FIG. 8 is a top plan view of the clip array of FIG. 7.
Figure 9:
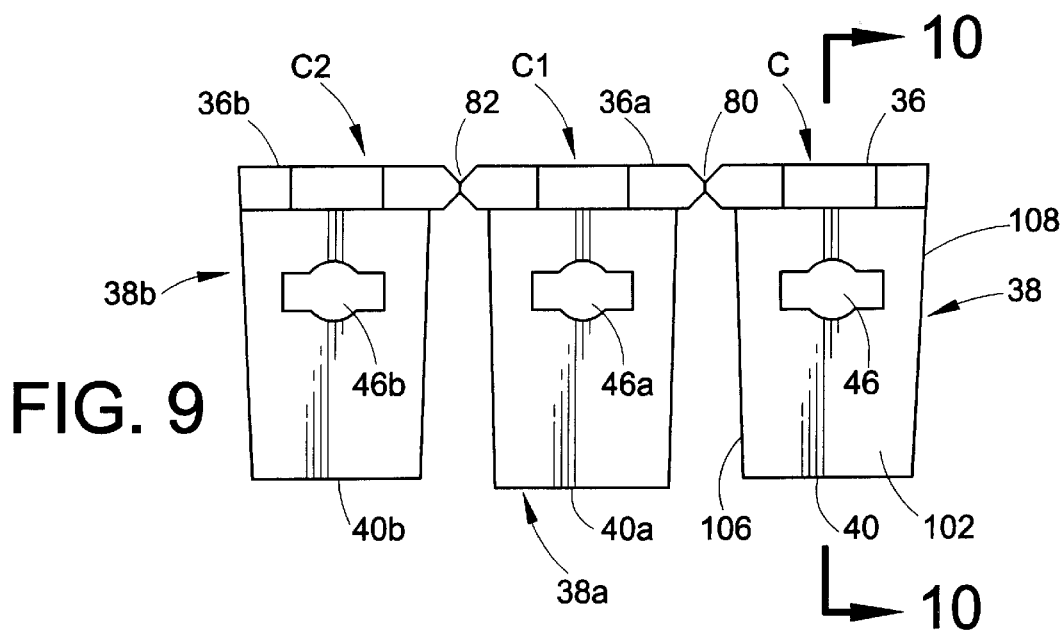
FIG. 9 is a side elevational view of the clip array of FIGS. 7 and 8.
Figure 10:
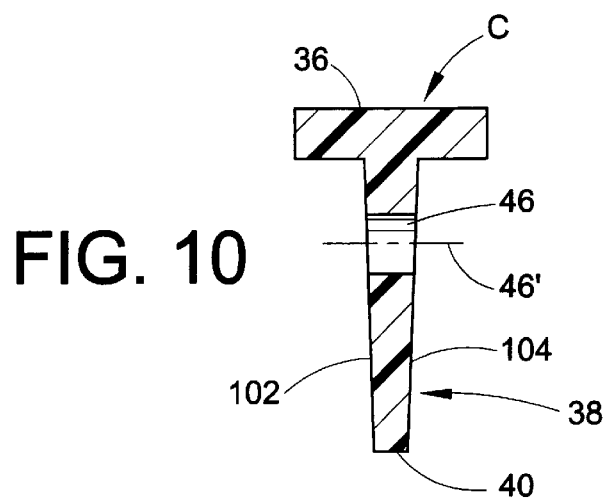
FIG. 10 is a cross-sectional elevational view taken generally on line 10—10 of FIG. 9.

FIG. 7 shows an array C' of individual clips C, C1 and C2. Clip base 36a is molded integrally with and joined to clip bases 36, 36b by weakened frangible connections 80, 82 that may be broken by bending and twisting adjacent clips relative to one another. Clip base 36 has an oblong hole 84 therethrough, while clip bases 36a, 36b have circular holes 86, 88 therethrough of different diameters. The end portion of a fiber optic cable may be inserted through holes 84, 86 and 88 to determine the appropriate clip that will provide controlled compression on the cable when it is positioned within the slot on the retainer. Oblong hole 84 is for a fiber optic cable that has an oblong cross-sectional configuration rather than a circular cross-sectional shape.

At least two of clip projections 38, 38a and 38b have different lengths for providing controlled compression on fiber optic cables of different sizes. For example, in one arrangement, the length of projection 38 on clip C from the underside of clip base 36 to projection tip 40 may be 0.667 inches while the length of projection 38a on clip C1 from the underside of clip base 36a to projection tip 40a may be 0.695 inches. Thus, when the underside clip base C1 is bottomed out against the top end 14 of post 12, tip end 40a will be spaced a predetermined distance from slot bottom 70 which is less than the spacing of projection tip 40 from slot bottom 70 when the base of clip C is bottomed out against post top end 14. This provides controlled compression on different sizes and shapes of fiber optic cables received in slot 30. Clip C2 has a projection tip 40b.

Projection holes 46, 46a and 46b are located adjacent clip bases 36, 36a and 36b. The centerline of each hole is located the same distance from the underside of its corresponding clip base. The centerline of each hole is closer to the underside of the clip base than to the projection tip. By way of example, with projection 38 having a length of 0.667 inches from the underside of clip base 736 to projection tip 40, centerline 46' of projection hole 46 is located 0.208 inches from the underside of clip base 36 and 0.459 inches from projection tip 40.

Figure 11:
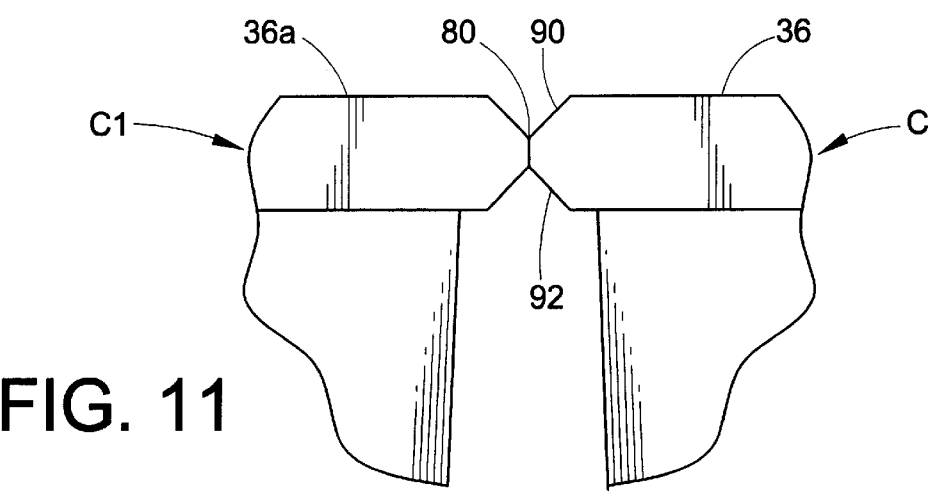
FIG. 11 is an enlarged side elevational view of a frangible connection between adjacent clips in the clip array of FIGS. 7–9.

FIG. 11 shows a frangible connection 80 as being formed by a very thin section of material between a V-shaped groove 90 and an inverted V-shaped groove 92. Adjacent clips may be bent and twisted relative to one another to sever the frangible connection for using an appropriate clip to match the size of the fiber optic cable.

The configuration of projection 38 on clip C will be described with the understanding that the configuration of clip projections 38a and 38b are the same. Clip projection 38 has opposite clip faces 102, 104 that diverge from projection tip 40 toward clip base 36 at an included angle of 4°. Thus, each projection side face is inclined at 2° to the vertical. Clip projection 38 has opposite projection ends 106, 108 that converge in a direction from clip base 36 toward projection tip 40. Each projection end 106, 108 may be inclined to the vertical at an angle of around 2° so that the length of projection tip 40 is smaller than the length of the projection at the intersection thereof with the underside of clip base 36.

The width of each clip projection between opposite projection ends 106, 108 is less than the length of slot 30 between post end faces 17, 18. By way of example, the width of each clip projection at the intersection thereof with its base 36 may be 0.500 inch while the length of slot 30 at the intersection thereof with post top end 14 is 0.550. Thus, the width of a clip projection between projection ends 106, 108 at any point along its entire length is less than the length of the slot at any point along its entire length.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A strain relief for cables comprising: a retainer for receiving a cable and a clip for holding a cable to the retainer, said retainer including a top end and opposite outwardly facing end faces, said retainer having a cable receiving slot that opens outwardly at said top end and at both of said end faces, said slot having a slot length in the direction that a cable extends through the slot, said slot having a slot width perpendicular to the direction in which a cable extends through the slot, said slot having a slot depth in the direction in which a cable is moved into the upwardly open slot, said slot having a slot bottom, said clip having a clip projection receivable in said slot, said clip projection having a clip projection tip engageable with a cable received in said slot between said slot bottom and said retainer top end so that said projection tip is spaced toward said slot bottom from said retainer top end, said slot having opposite slot sidewalls diverging upwardly from said slot bottom so that said slot width progressively increases in a direction upwardly from said slot bottom, said clip projection having clip projection side faces that are positioned between and face toward said slot sidewalls, and said clip projection side faces diverging in a direction upwardly from said clip projection tip.

2. The strain relief of claim 1 wherein said slot sidewalls and said clip projection side faces diverge at the same included angle.

3. A strain relief for cables comprising: a retainer for receiving a cable and a clip for holding a cable to the retainer, said retainer including an upwardly open slot for receiving a cable, said slot having a slot length in the direction that a cable extends through the slot, said slot having a slot width perpendicular to the direction in which a cable extends through the slot, said slot having a slot depth in the direction in which a cable is moved into the upwardly open slot, said clip having a clip projection receivable in said slot, said clip projection having a clip projection tip engageable with a cable received in said slot, said slot having a slot bottom, and said slot length gradually decreasing in a direction upwardly from said slot bottom.

4. A strain relief for cables comprising: a retainer for receiving a cable and a clip for holding a cable to the retainer, said retainer including an upwardly open slot for receiving a cable, said slot having a slot length in the direction that a cable extends through the slot, said slot having a slot width perpendicular to the direction in which a cable extends through the slot, said slot having a slot depth in the direction in which a cable is moved into the upwardly open slot, said clip having a clip projection receivable in said slot, said clip projection having a clip projection tip engageable with a cable received in said slot, said clip including a clip base from which said clip projection extends, said clip base extending outwardly beyond said clip projection, and said clip base having at least one cable gauge hole therethrough for receiving a cable to gauge the size of the cable.

5. A cable strain relief retainer having a flat base, a post extending upwardly perpendicular to said base, said base extending outwardly beyond said post, said post having a post top end spaced above said base, a slot extending into said post from said post top end toward said base, said post having a post length between said post top end and said base, said slot having a slot bottom and slot sidewalls, said slot having a depth from said post top end to said slot bottom that is greater than one-half said post length, said slot sidewalls diverging in a direction from said slot bottom toward said post top end, said slot having a slot width between said slot sidewalls, aligned post holes through said post and said slot sidewalls in the direction of said slot width, said post holes being adjacent said post top end, a clip having a clip projection receivable in said slot, and said clip projection having a hole therethrough alignable with said post holes.

6. The retainer of claim 5 wherein said slot has a slot length in the direction in which a cable extends therethrough, said base having opposite base mounting portions extending outwardly from said post in the direction of said slot length, and said base mounting portions having mounting holes therethrough.

7. An array of clips for holding fiber optic cables to a retainer comprising: at least two clips having clip bases joined together by a frangible connection, each said clip base having a projection extending therefrom, each said projection having a projection tip, each said projection having a projection length from said clip base to said projection tip, one of said projection lengths being longer than the other said projection length, and each said clip base having a different size gauge hole therethrough.

8. The array of claim 7 wherein said gauge holes have different shapes.

9. The array of claim 7 wherein each said projection has opposite projection faces that diverge in a direction from said projection tip toward said clip base.

10. The array of claim 9 wherein each said projection has opposite projection ends extending between said clip base and said projection tip, said opposite projection ends diverging in a direction from said projection tip toward said clip base.

11. An array of clips for holding fiber optic cables to a retainer comprising: at least two clips having clip bases joined together by a frangible connection, each said clip base having a projection extending therefrom, each said projection having a projection tip, each said projection having a projection length from said clip base to said projection tip, one of said projection lengths being longer than the other said projection length, and a transverse hole through each said projection adjacent said clip base.

12. A cable strain relief retainer having a flat base, a post extending upwardly perpendicular to said base, said post having a post top end spaced above said base, a slot extending into said post from said post top end toward said base, said post having a post length between said post top end and said base, said slot having a depth from said post top end to said base that is greater than one-half said post length, a clip having a generally flat clip base and a clip projection extending perpendicular to said clip base, said clip base extending outwardly beyond said clip projection, said clip projection being receivable in said post slot with said clip base overlying said post top end, and said post and said clip projection having transverse holes therethrough that are aligned with one another when said clip base is bottomed out against said post top end.

13. A clip for holding a cable to a retainer, said clip having a generally flat clip base, a clip projection extending perpendicular to said clip base, said clip projection having a projection tip, opposite projection faces and opposite projection ends, a hole through said projection in a direction between said projection faces adjacent said clip base, said hole being located between said clip base and said projection tip, said clip base extending outwardly beyond said projection faces in generally the same direction that said hole extends through said projection, said projection faces and said projection ends having a length that extends from said clip base to said projection tip, and said projection faces and said projection ends converging along their entire length in a direction from said clip base toward said projection tip.

14. A clip for holding a cable to a retainer, said clip having a generally flat clip base, a clip projection extending perpendicular to said clip base, said clip base extending outwardly beyond said clip projection, said clip projection having a projection tip, opposite projection faces and opposite projection ends, a hole through said projection in a direction between said projection faces adjacent said clip base, said hole being located between said clip base and said projection tip, said clip base extending outwardly beyond said projection faces in generally the same direction that said hole extends through said projection, and at least one cable gauge hole through said clip base outwardly of said clip projection for receiving a cable to gauge the size of the cable.

15. An array of clips for holding fiber optic cables to a retainer comprising: at least two clips having generally flat clip bases directly joined together by a frangible connection, each said clip base having a generally flat projection extending perpendicular therefrom, each said projection having a projection tip, each said projection having a projection length from said clip base to said projection tip, and one of said projection lengths being longer than the other said projection length.

16. A strain relief for cables comprising: a retainer for receiving a cable and a clip for holding a cable to the retainer, said retainer including an upwardly open slot for receiving a cable, said slot having a slot length in the direction that a cable extends through the slot, said slot having a slot width perpendicular to the direction in which a cable extends through the slot, said slot having a slot depth in the direction in which a cable is moved into the upwardly open slot, said clip having a clip projection receivable in said slot, said clip projection having a clip projection tip engageable with a cable received in said slot, said clip including a clip base from which said clip projection extends, and said clip base having a cable gauge hole therethrough for receiving a cable to gauge the size of the cable.

* * * * *